United States Patent
Liu et al.

(10) Patent No.: US 8,306,322 B2
(45) Date of Patent: Nov. 6, 2012

(54) BITSTREAM SYNTAX FOR GRAPHICS-MODE COMPRESSION IN WIRELESS HD 1.1

(75) Inventors: Wei Liu, San Jose, CA (US); Mohammad Gharavi-Alkhansari, Santa Clara, CA (US)

(73) Assignee: Sony Corporation, Tokyo (JP)

( * ) Notice: Subject to any disclaimer, the term of this patent is extended or adjusted under 35 U.S.C. 154(b) by 325 days.

(21) Appl. No.: 12/873,059

(22) Filed: Aug. 31, 2010

(65) Prior Publication Data

US 2011/0058737 A1    Mar. 10, 2011

Related U.S. Application Data

(60) Provisional application No. 61/240,883, filed on Sep. 9, 2009, provisional application No. 61/246,011, filed on Sep. 25, 2009, provisional application No. 61/251,459, filed on Oct. 14, 2009, provisional application No. 61/267,318, filed on Dec. 7, 2009.

(51) Int. Cl.
*G06K 9/00* (2006.01)
*G06K 9/36* (2006.01)
*G06K 9/46* (2006.01)

(52) U.S. Cl. ........................................ 382/166; 382/240

(58) Field of Classification Search ................. 382/162, 382/164, 166, 232, 240; 348/231.99, 427.1, 348/E5.024; 375/240.24, E7.076; 386/307, 386/328, E5.003; 345/690; 341/141
See application file for complete search history.

(56) References Cited

U.S. PATENT DOCUMENTS

| 4,319,267 A | 3/1982 | Mitsuya et al. |
| 4,779,144 A * | 10/1988 | Dischert et al. ............... 386/307 |
| 5,659,631 A | 8/1997 | Gormish et al. |

(Continued)

FOREIGN PATENT DOCUMENTS

WO    9837700 A1    8/1998

(Continued)

OTHER PUBLICATIONS

Wu, Guo-Zua et al., High-Performance Sub-Picture Compression Algorithm Used in High-Definition Video Discs, IEEE Transations on Magnetics, vol. 43, No. 2, Feb. 2007, pp. 776-779.

(Continued)

*Primary Examiner* — Amir Alavi
(74) *Attorney, Agent, or Firm* — Haverstock & Owens LLP

(57) ABSTRACT

A method of and system for encoding high definition video content using embedded graphics coding is described. The method determines if the video content includes an RGB or YUV444 color format or a YUV422 color format. If the color scheme includes RGB or YCbCr444 data and separate encoding is used, then all three color components are encoded separately using scalar EGC. If the color scheme includes RGB or YCbCr444 data and joint encoding is used, then all three color components are jointly encoded using joint scalar EGC. If the color scheme includes YCbCr422 data and separate encoding is used, then Y, U and V are encoded separately using scalar EGC. If the color scheme includes YCbCr422 data and joint encoding is used, then Y is encoded by itself using scalar EGC and U and V are jointly encoded using joint scalar EGC.

44 Claims, 5 Drawing Sheets

U.S. PATENT DOCUMENTS

| | | | |
|---|---|---|---|
| 5,805,226 | A | 9/1998 | Jung |
| 6,441,829 | B1 * | 8/2002 | Blalock et al. ............... 345/690 |
| 6,778,709 | B1 | 8/2004 | Taubman |
| 7,200,276 | B2 * | 4/2007 | Mehrotra .................... 382/239 |
| 7,764,834 | B2 * | 7/2010 | Simard et al. ............... 382/166 |
| 2006/0115166 | A1 | 6/2006 | Sung et al. |
| 2007/0091999 | A1 | 4/2007 | Nissan-Cohen et al. |
| 2007/0098063 | A1 | 5/2007 | Reznic et al. |
| 2007/0189397 | A1 | 8/2007 | Ngo et al. |
| 2007/0202842 | A1 | 8/2007 | Shao et al. |
| 2008/0089406 | A1 | 4/2008 | Fukuhara et al. |
| 2008/0165859 | A1 | 7/2008 | Sung et al. |
| 2008/0298694 | A1 | 12/2008 | Kim et al. |
| 2009/0265744 | A1 | 10/2009 | Singh et al. |
| 2010/0322597 | A1 * | 12/2010 | Gharavi-Alkhansari et al. ............... 386/328 |
| 2011/0058737 | A1 * | 3/2011 | Liu et al. .................... 382/166 |
| 2011/0085058 | A1 * | 4/2011 | Liu et al. ................ 348/231.99 |

FOREIGN PATENT DOCUMENTS

| | | |
|---|---|---|
| WO | 2011005511 A2 | 1/2011 |

OTHER PUBLICATIONS

Noam Geri, "Wireless HDTV solves problems that compression cannot", EE Times-India,www.eetindia.com, pp. 1-3, 2008.

Singh, Harkirat et al., "A 60GHz Wireless Network for Enabling Uncompressed Video Communication", Department of Electrical and Computer Engineering Articles,IEE Communications Magazine, Dec. 2008,pp. 71-78, http://opensiuc.lib.siu.edu/ecc_articles/8.

A.J. Pinho, "Region-Based Near-Lossless Image Compression", Acoustics, Speech, and Signal Processing, May 2011,IEEE International Conference, vol. 3, pp. 1761-1764.

* cited by examiner

BITSTREAM SYNTAX FOR GRAPHICS-MODE COMPRESSION IN WIRELESS HD 1.1

CROSS-REFERENCE TO RELATED APPLICATION(S)

This application claims priority under 35 U.S.C. 119(e) of the U.S. Provisional Patent Application Ser. No. 61/240,883, filed Sep. 9, 2009 and entitled, "Bitstream Syntax for Graphics-Mode Compression in Wireless HD 1.1," and U.S. Provisional Patent Application Ser. No. 61/246,011, filed Sep. 25, 2009 and entitled, "Detailed Bitstream Syntax for Graphics-Mode Compression in Wireless HD," and of the U.S. Provisional Patent Application Ser. No. 61/251,459, filed Oct. 14, 2009, and entitled "ENHANCED BITSTREAM SYNTAX FOR GRAPHICS-MODE COMPRESSION IN WIRELESS HD," and of the U.S. Provisional Patent Application Ser. No. 61/267,318, filed Dec. 7, 2009, and entitled "Modified Bitstream Syntax for Graphics-Mode in Wireless HD," which are all hereby incorporated by reference in their entireties for all purposes.

FIELD OF THE INVENTION

The present invention relates to the field of image processing. More specifically, the present invention relates to encoding and decoding images/videos.

BACKGROUND OF THE INVENTION

The Wireless HD 1.0 standard defines a wireless video area network (WVAN) for the connection of consumer electronic (CE) audio and video devices. A key attribute of the WirelessHD system is its ability to support the wireless transport of an uncompressed 1080p A/V stream with a high quality of service (QoS) within a room at distances of ten meters.

The requirement for high data throughput at distances of 10 meters requires a large allocated frequency spectrum. A large amount spectrum is available on an unlicensed basis in many countries in the 60 GHz band. In North America and Japan, a total of 7 GHz is allocated for use, 5 GHz of which is overlapping. The band 57~64 GHz is allocated in North America while 59-66 GHz is allocated in Japan. In addition, Korea and the European Union have also allowed similar allocations. The regulator agencies allow very high effective transmit power (the combination of transmitter power and antenna gain), greater than 10 W of effective isotropic radiated power (EIRP). High EIRP and wide allocated bandwidth will allow high throughput connections that, however, are very directional.

The WirelessHD 1.0 specification defines a wireless protocol that enables directional connections that adapt very rapidly to changes in the environment. This is accomplished by dynamically steering the antenna beam at the transmitter while at the same time focusing the receiver antenna in the direction of the incoming power from the transmitter. This dynamic beam forming and beam steering utilizes not only the direct path, but allows the use of reflections and other indirect paths when the line-of-sight connection is obstructed. This dynamic adjustment of the antenna energy is completed in less than one millisecond.

The WVAN includes one Coordinator and zero or more Stations. The Coordinator schedules time in the channel to ensure that the wireless resources are prioritized for the support of A/V streams. The other devices that are a part of the WVAN are referred to as Stations. A station may be the source and/or sink of data in the network. The device that is the Coordinator also acts as a Station in the WVAN and may act as a source and/or sink of data. <http://www.wirelesshd.org/technology.html>

Most image compression schemes are designed for "natural images" such as photos taken by a digital camera. For natural images, strong correlation exists among neighboring pixels. Hence, most image compression schemes work as follows:

1. The pixels are decorrelated using prediction or transform or both, resulting in a sparse histogram of the prediction residuals or transform coefficients. The histogram has a single peak which is located around 0.
2. Quantization is applied as necessary.
3. The (quantized) prediction residuals or transform coefficients are entropy coded. The entropy coder is designed for distributions described above. If the distribution has a significantly different shape, the coding performance is able to be poor.

However, there are many "unnatural images" such as images of graphics or text which typically have a large dynamic range, strong contrast, sharp edges, strong textures and sparse histograms. These types of images are usually not handled well by conventional image compression algorithms. Inter-pixel correlation is weaker, and prediction or transform does not provide a sparse distribution as it does for natural images.

Some schemes have been proposed for unnatural images. One example is referred to as "histogram packing" where the encoder goes through the whole image, computes the histogram and does a non-linear mapping of the pixels before compressing the image. The compression requires a two-pass processing, causing increased memory cost and more computations. The bitstream is not scalable which means that the decoder needs the whole bitstream to decode the image. Partial reconstruction is not possible without re-encoding.

SUMMARY OF THE INVENTION

A method of and system for encoding high definition video content using embedded graphics coding is described. The method determines if the video content includes an RGB or YUV444 color format or a YUV422 color format. If the color scheme includes RGB or YCbCr444 data and separate encoding is used, then all three color components are encoded using scalar EGC. If the color scheme includes RGB or YCbCr444 data and joint encoding is used, then all three color components are jointly encoded. If the color scheme includes YCbCr422 data and separate encoding is used, then Y, U and V are encoded using scalar EGC. If the color scheme includes YCbCr422 data and joint encoding is used, then Y is encoded by itself and U and V are jointly encoded.

In one aspect, a method of encoding programmed in a controller in a device comprises partitioning an image into blocks, separating the blocks into groups, sharing grouping data among color components and encoding a block from the most significant bit plane to the least significant bit plane and in each bit plane, processing existing groups. Encoding the block includes encoding each group of the groups separately for each bit plane. Processing the existing groups includes if members of the group have different values within the current bit plane, the group is split into two, unless at least one of two conditions exist, the two conditions including a total number of groups reaching a maximum limit of the groups or the total number of members in the group falling below a minimum limit, if either of the two conditions become true, then refinement bits of members of the group are encoded as raw bits, otherwise if a split happens to a group, a value indicating the split is sent, followed by one bit indicating the refinement bit of the group members; otherwise a value indicating no split is sent, followed by the refinement bits of each group member, the group is split into two according to the refinement bits, and the split is applied to additional colors of the block. The encoding is based on a color scheme used. The color scheme includes RGB or YCbCr444 data, and all three color components are encoded together. The color scheme includes YCbCr422 data, and Y is encoded by itself and U and V are jointly encoded. The color scheme includes RGB, YCbCr444 or YCbCr422 data, and each color is coded separately. An indicator indicates the color scheme implemented, the color scheme selected from the group consisting of RGB, YCbCr444 and YCbCr422 and whether joint coding or separate coding is implemented. The grouping data includes information about which groups pixels belong to. Encoding each bit plane of the block is in an arbitrary order, wherein arbitrary includes any order of color components but going from the most significant bit plane to the least significant bit plane. The controller is selected from the group consisting of a programmed computer readable medium and an application-specific circuit. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

In another aspect, an encoder device comprises a memory for storing an application, the application for partitioning an image into blocks, separating the blocks into groups, sharing grouping data among color components and encoding a block from the most significant bit plane to the least significant bit plane and in each bit plane, processing existing groups and a processing component coupled to the memory, the processing component configured for processing the application. Encoding the block includes encoding each group of the groups separately for each bit plane. Processing the existing groups includes: if members of the group have different values within the current bit plane, the group is split into two, unless at least one of two conditions exist, the two conditions including a total number of groups reaching a maximum limit of the groups or the total number of members in the group falling below a minimum limit, if either of the two conditions become true, then refinement bits of members of the group are encoded as raw bits, otherwise if a split happens to a group, a value indicating the split is sent, followed by one bit indicating the refinement bit of the group members; otherwise a value indicating no split is sent, followed by the refinement bits of each group member, the group is split into two according to the refinement bits, and the split is applied to additional colors of the block. The encoding is based on a color scheme used. The color scheme includes RGB or YCbCr444 data, and all three color components are encoded together. The color scheme includes YCbCr422 data, and Y is encoded by itself and U and V are jointly encoded. The color scheme includes RGB, YCbCr444 or YCbCr422 data, and each color is coded separately. An indicator indicates the color scheme implemented, the color scheme selected from the group consisting of RGB, YCbCr444 and YCbCr422 and whether joint coding or separate coding is implemented. The grouping data includes information about which groups pixels belong to. Encoding each bit plane of the block is in an arbitrary order, wherein arbitrary includes any order of color components but going from the most significant bit plane to the least significant bit plane.

In another aspect, a system programmed in a controller in a device comprises a partitioning module for partitioning an image into blocks, a separating module for separating the blocks into groups, a sharing module for sharing grouping data among color components and an encoding module for encoding a block from the most significant bit plane to the least significant bit plane and in each bit plane, processing existing groups. Encoding the block includes encoding each group of the groups separately for each bit plane. Processing the existing groups includes if members of the group have different values within the current bit plane, the group is split into two, unless at least one of two conditions exist, the two conditions including a total number of groups reaching a maximum limit of the groups or the total number of members in the group falling below a minimum limit, if either of the two conditions become true, then refinement bits of members of the group are encoded as raw bits, otherwise if a split happens to a group, a value indicating the split is sent, followed by one bit indicating the refinement bit of the group members; otherwise a value indicating no split is sent, followed by the refinement bits of each group member, the group is split into two according to the refinement bits, and the split is applied to additional colors of the block. The encoding is based on a color scheme used. The color scheme includes RGB or YCbCr444 data, and all three color components are encoded together. The color scheme includes YCbCr422 data, and Y is encoded by itself and U and V are jointly encoded. The color scheme includes RGB, YCbCr444 or YCbCr422 data, and each color is coded separately. An indicator indicates the color scheme implemented, the color scheme selected from the group consisting of RGB, YCbCr444 and YCbCr422 and whether joint coding or separate coding is implemented. The grouping data includes information about which groups pixels belong to. Encoding each bit plane of the block is in an arbitrary order, wherein arbitrary includes any order of color components but going from the most significant bit plane to the least significant bit plane. The controller is selected from the group consisting of a programmed computer readable medium and an application-specific circuit. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

In yet another aspect, a camera device comprises a video acquisition component for acquiring a video, a memory for storing an application, the application for partitioning an image of the video into blocks, separating the blocks into groups, sharing grouping data among color components and encoding a block from the most significant bit plane to the least significant bit plane and in each bit plane, processing existing groups and a processing component coupled to the memory, the processing component configured for processing the application. Encoding the block includes encoding each group of the groups separately for each bit plane. Processing the existing groups includes: if members of the group have different values within the current bit plane, the group is split into two, unless at least one of two conditions exist, the two conditions including a total number of groups reaching a maximum limit of the groups or the total number of members in the group falling below a minimum limit, if either of the two conditions become true, then refinement bits of members of the group are encoded as raw bits, if a split happens to a group, a value indicating the split is sent, followed by one bit indicating the refinement bit of the group members; otherwise a value indicating no split is sent, followed by the refinement bits of each group member, the group is split into two according to the refinement bits, and the split is applied to additional colors of the block. The encoding is based on a color scheme used. The color scheme includes RGB or YCbCr444 data, and all three color components are encoded together. The color scheme includes YCbCr422 data, and Y is encoded by itself and U and V are jointly encoded. The color scheme includes RGB, YCbCr444 or YCbCr422 data, and each color is coded separately. An indicator indicates the color scheme implemented, the color scheme selected from the group consisting of RGB, YCbCr444 and YCbCr422 and whether joint coding or separate coding is implemented. The grouping data includes information about which groups pixels belong to. Encoding each bit plane of the block is in an arbitrary order, wherein arbitrary includes any order of color components but going from the most significant bit plane to the least significant bit plane.

DETAILED DESCRIPTION OF THE PREFERRED EMBODIMENT

Figure 1:
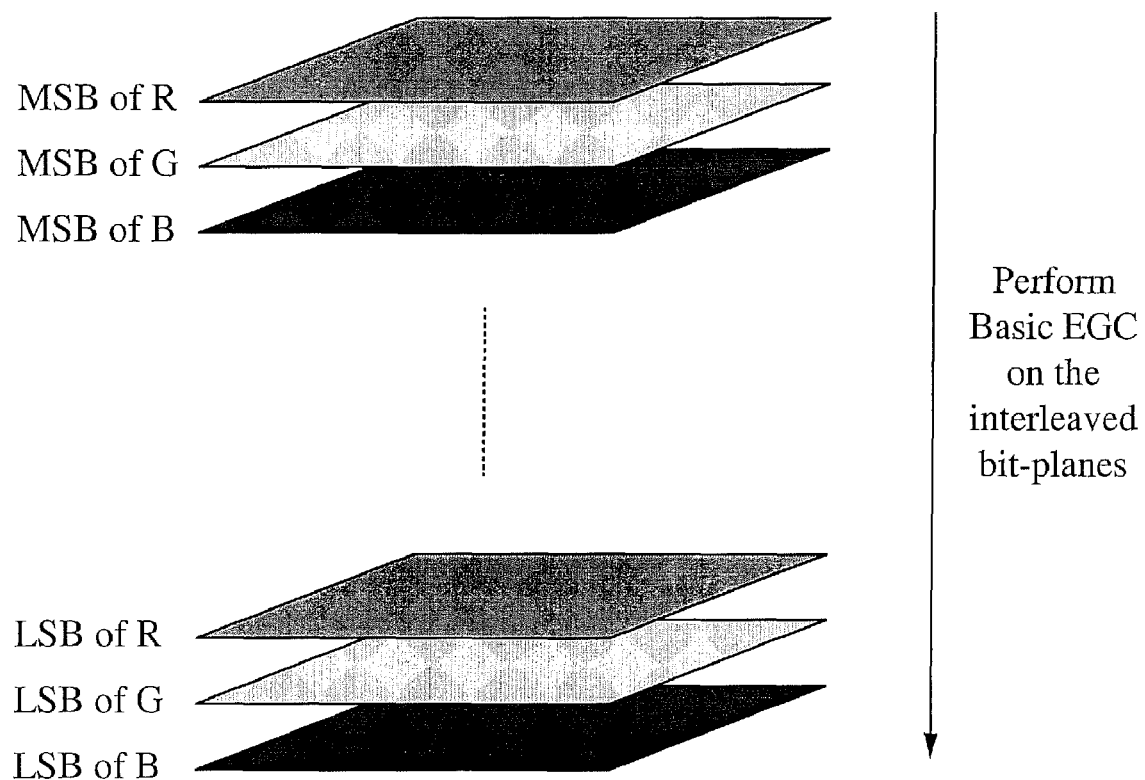
FIG. 1 illustrates a diagram of interleaving colors according to some embodiments.

A method of and system for compressing high definition video content transmitted over a wireless channel is described herein. The method uses Embedded Graphics Coding (EGC) or a variant of EGC for compressing the high definition video content to improve bandwidth efficiency.

EGC

A video frame is divided into multiple blocks. The syntax for encoding and decoding a block depends on whether a block is encoded in a Graphics mode. Graphics mode includes an encoding using EGC or any other graphics encoding implementation. In EGC, the pixels of each block having the same value are grouped together. Beginning from the Most Significant Bit-plane (MSB) and moving towards the Least Significant Bit-plane (LSB), the encoder processes all of the groups in a bit plane. If all of the group members have the same bit value at the current bit plane being processed, then the encoder sends a "0" as an overhead bit, followed by the bit value of the group members. If the group members do not have the same value, the encoder splits the group into two and sends a "1" as an overhead bit, followed by refinement bits for each pixel of the group.

As described above, EGC and variations of EGC are able to be used to encode the images. Included herein are some possible variations of EGC.

U.S. patent application Ser. No. 12/795,210, filed Jun. 7, 2010 and entitled, "Embedded Graphics Coding for Images with Sparse Histograms," which is hereby incorporated by reference in its entirety for all purposes.

In U.S. patent application Ser. No. 12/873,009, filed Aug. 31, 2010 and entitled, "JOINT SCALAR EMBEDDED GRAPHICS CODING FOR COLOR IMAGES," which is hereby incorporated by reference in its entirety for all purposes, the use of joint coding of multiple color components is described.

RGB or YUV444

RGB or YUV444 uses EGC or a similar variant. A video frame is divided into multiple blocks, and the syntax for encoding and decoding depends on whether a block is encoded by a graphics mode. For the graphics mode, an indicator is used to specify if joint coding or separate coding is used. In separate coding, the pixels of each block having the same value are grouped together. Beginning from the Most Significant Bit-plane (MSB) and moving towards the Least Significant Bit-plane (LSB), the encoder processes all of the groups in a bit plane, for example, with the method described in U.S. patent application Ser. No. 12/795,210, filed Jun. 7, 2010 and entitled, "Embedded Graphics Coding for Images with Sparse Histograms." In the case of joint coding, the pixels of each block having the same color (e.g. the same pixel values in all three color components) are grouped together, joint scalar EGC is used for all three color components, for example, with the method described in U.S. patent application Ser. No. 12/873,009, filed Aug. 31, 2010 and entitled, "JOINT SCALAR EMBEDDED GRAPHICS CODING FOR COLOR IMAGES."

YUV422

For YUV422 data, a block is also able to be coded either jointly or separately. In the joint coding, a block of the Y components is encoded by itself using scalar EGC, for example, as described in U.S. patent application Ser. No. 12/795,210, filed Jun. 7, 2010 and entitled, "Embedded Graphics Coding for Images with Sparse Histograms," while blocks of the U and V components that have the same spatial location are encoded together using joint scalar EGC, for example, as described in U.S. patent application Ser. No. 12/873,009, filed Aug. 31, 2010 and entitled, "JOINT SCALAR EMBEDDED GRAPHICS CODING FOR COLOR IMAGES." In the separate coding case, each color component is coded by itself using scalar EGC, for example, the method described in U.S. patent application Ser. No. 12/795,210, filed Jun. 7, 2010 and entitled, "Embedded Graphics Coding for Images with Sparse Histograms."

Slice-Level Syntax

Initially, the encoder and decoder should agree on several items such as:

1. A binary flag (e.g. jointCodingFlag) indicates whether different color components of a block are coded jointly;

2. $N_{max}$ is the minimum allowed number of groups in encoding a block; if the total number of groups reaches $N_{max}$, a group is not split further which simplifies the hardware implementation;

3. $C_{min}$ is the minimum number of members in a group (cardinality of the group) that is required in order for the group to be allowed to be split; if the number of members of the current group $\leq C_{min}$, the group is not further split which simplifies the coding of small groups.

Each of the values are able to be either signaled for each slice, or for each frame or even each Group of Pictures (GOP) or hardwired into the encoder/decoder.

Block-Level Syntax

One bit (or more bits) of signaling is used to indicate the use of the Graphics mode for each block.

Bit Plane Level Syntax

A bit plane contains one or multiple groups. When decoding bit plane k, the decoder knows that there are $N_k$ groups to process, so the data for bit plane k contains: group 1, group 2, ... up to group $N_k$, and $N_k \leq N_{max}$.

FIG. 1 illustrates a diagram of interleaving colors according to some embodiments. The bit-planes of RGB are interleaved to generate a virtual block with 24 bit planes. Scalar EGC is able to be applied directly to the virtual block or two-level signaling of splitting is able to be implemented.

Figure 2:
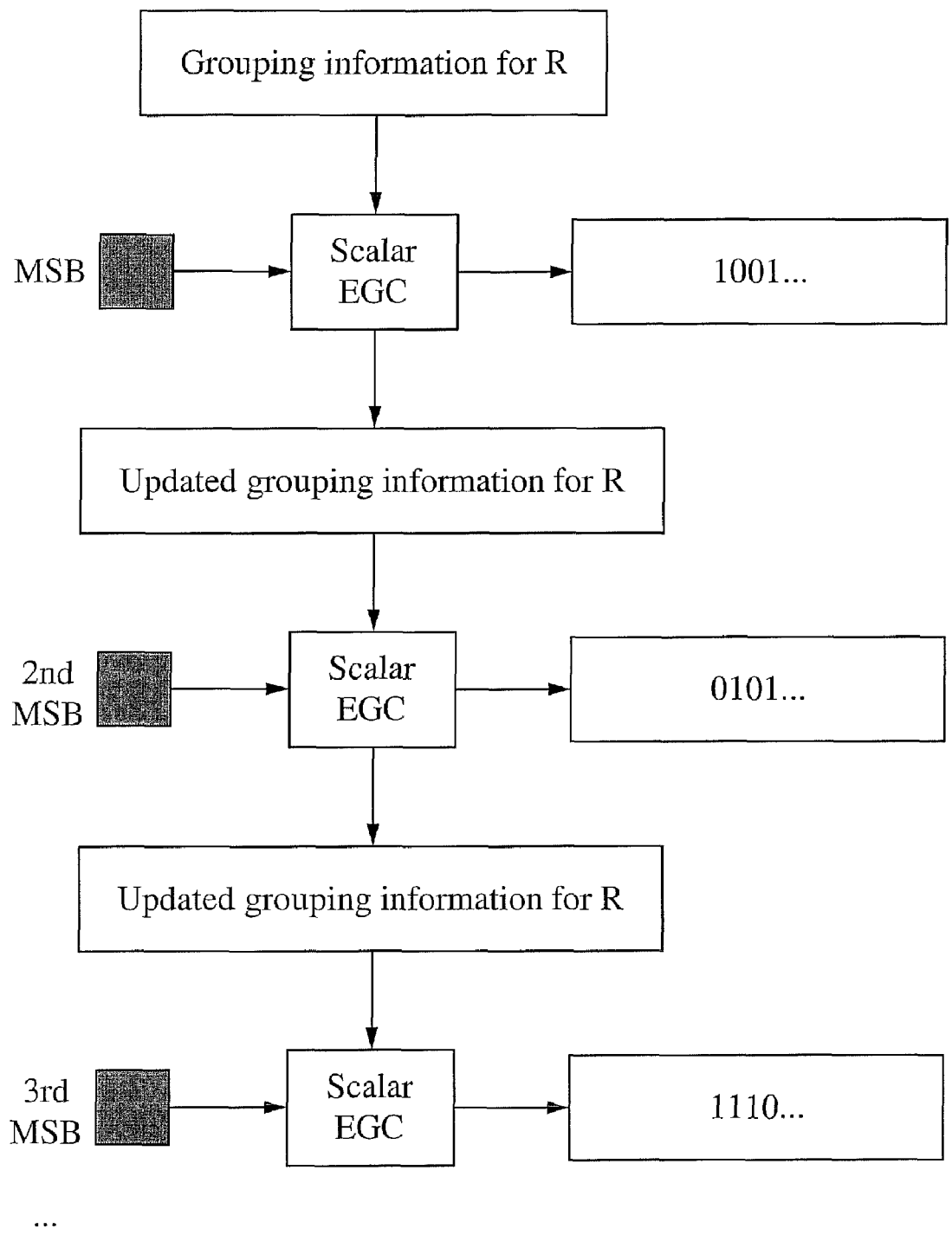
FIG. 2 illustrates a diagram of scalar EGC.
Figure 3:
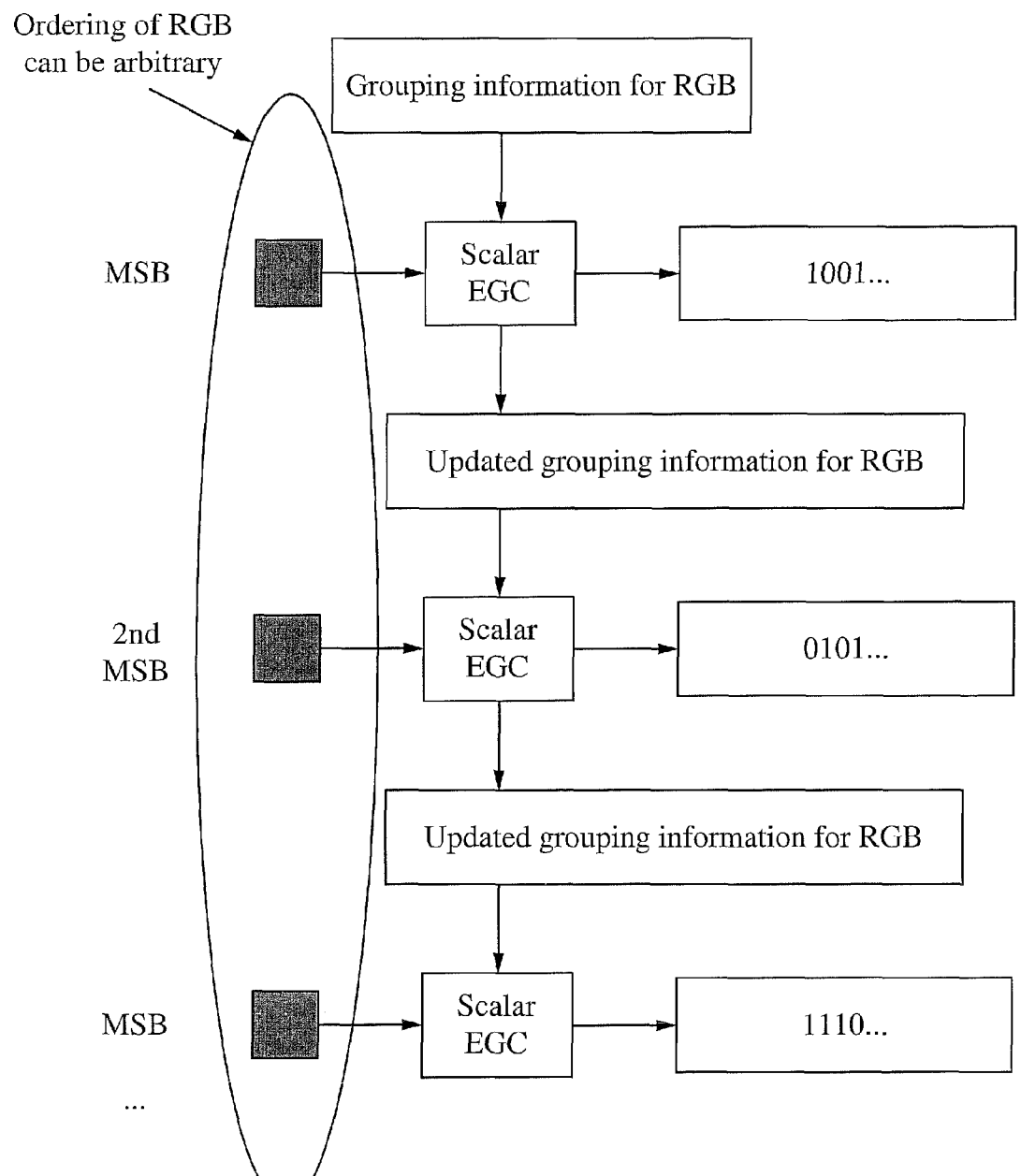
FIG. 3 illustrates a diagram of improved scalar EGC.

FIGS. 2 and 3 illustrate diagrams of scalar EGC (FIG. 2) and improved scalar EGC (FIG. 3). Scalar EGC is not as efficient as joint EGC because the grouping information is not shared. In the worst case, the same grouping information is coded three times in all RGB components. The joint scalar EGC achieves better coding efficiency by using the shared grouping information. Furthermore, in the joint scalar EGC method, the processing order of RGB is able to be arbitrary, however within each color component, the bit planes are coded from MSB to LSB. An example of acceptable arbitrariness includes: encoding R1, R2, G1, B1, B2, B3, G2 ... until the LSB. An example of an unacceptable arbitrary encoding includes: R1, B1 G2, G1, ..., since G2 is not able to be encoded before G1.

An exemplary WiHD codec bitstream syntax is described herein.

```
Slice Syntax
slice (nblocks, color_format, CD_field_value) {
    nPix_per_blk=64
    if (graph_mode_used == 1) {
        graph_nGrps_per_blk_max_in_pow2
        graph_nGrps_per_blk_max =
            (1<<graph_nGrps_per_blk_max_in_pow2)
        graph_nMbrs_per_grp_min
        graph_color_jnt_coding
    }
}
``` graph_nGrps_per_blk_max_in_pow2 is obtained by reading 3 bits from the bitstream, and is used to compute graph_nGrps_per_blk_max, which determines the maximum number of groups allowed for a block. The value of graph_nGrps_per_blk_max could be 1, 2, 4, ... up to 64. Groups stop splitting after the number of groups has reached graph_nGrps_per_blk_max. graph_nMbrs_per_grp_min is obtained by reading 2 bits from the bitstream, which specifies the minimum number of members of a group. A group has less members than this number is not further split.
graph_color_jnt_coding is obtained by reading 1 bit from the bitstream. If graph_color_jnt_coding is equal to 1, it is indicated that RGB or YUV joint coding is used in the graphics mode. For RGB and YCbCr444 data, all three color components are coded together, while for YCbCr422 data, Y is coded by itself and UV are jointly coded. If graph_color_jnt_coding is equal to 0, each color component is coded by itself.

```
Graph_mode_init Syntax
graph_mode_init( ) {
    for (i=0; i<nBlocks; i++) {
        nGrps_in_blk[i] = 1 /*initially there is only one group*/
        for (j=0; j<nPix_per_blk; j++) {
            group_index[i][j] = 0 /*all pixels belong to group 0*/
            image_data[i*nPix_per_blk+j] = 0
        }
        nMbrs_in_grp[i][0] = nPix_per_blk
```

```
-continued for (k=1; k<graph_nGrps_per_blk_max; k++) {
            nMbrs_in_grp[i][k] = 0 /*other groups are empty*/
        }
        graph_plane[i] = bitdepth
    }
}
```

The graph_mode_init function sets the reconstructed pixel values to zero and the number of bitplanes to process to bitdepth, and initiates three arrays (group_index, nGrps_in_blk and nMbrs_in_grp) for the Graphics mode coding, which are explained as follows:
group_index[i][j], specifies which group a pixel belongs to: group_index[i][j]==k means that, the pixel j in block i belongs to group k (of block i). It is initialized that all pixels in a block belong to the first group of the block.
nGrps_in_blk[i], specifies the number of members in the k-th group of block i. Initially, group 0 has 64 members, while other groups are empty. So nMbrs_in_grp[i][0] are set to 64 for all i's and nMbrs_in_grp[i][k]=0 for any other k.
nMbrs_in_grp[i][k], specifies the number of members in the k-th group of block i. Initially, group 0 has 64 members, while other groups are empty. So nMbrs_in_grp[i][0]=64 is set for all i's and nMbrs_in_grp[i][k]=0 is set for any other k.

```
Block_bit_scan syntax
block_bit_scan ( ) {
    for (i=0; i<nblocks; i++) {
        if (block_mode [scan_block[i]]==1) {
            if ((graph_data == 1) &&
                (block_completed_graph[scan_block[i]] == 0)){
                    if (data_each_block ==0) {
                        get_data_this_block( )
                    } else {
                        data_this_block = 1
                    }
                    if(data_this_block == 1) {
                        scan_graph_data( )
                    }
            }
        }
    }
}
```

The block_bit_scan processes a "scan" of the blocks in a slice, where each block is visited at most once in a scan. Whether or not a block is visited is defined by "data_this_block". If a block is visited in a scan, one more bit-plane of the block is decoded from the bitstream (through the scan_graph_data function).

```
Scan_graph_data Syntax
scan_graph_data( ) {
    cur_blk = scan_block[i]
    ref_blk = find_ref_blk(cur_blk)
    num_groups_old = nGrps_in_blk[ref_blk]
    for (j=0; j<nGrps_in_blk[cur_blk]; j++) {
        group_to_process[j] = 1
    }
    for (k=0; k<num_groups_old; k++) {
        each_member[k] = 0
        split_group[k] = 0
        new_group[k] = 0
    }
    for (k=0; k<num_groups_old; k++) {
        if (num_groups_old == graph_nGrps_per_blk_max ||
            nMbrs_in_grp[ref_blk][k]
                <= graph_nMbrs_per_grp_min) {
                each_member[k] = 1
                split_group[k] = 0
        } else {
            each_member[k]
```

-continued

```
                if (nGrps_in_blk[ref_blk] <
                    graph_nGrps_per_blk_max &&
                        each_member[k] == 1) {
                            new_group[k] =
                            nGrps_in_blk[ref_blk]++
                            split_group[k] = 1
                } else {
                            split_group[k] = 0
                }
        }
    }
    for (k=0; k<num_groups_old; k++) {
        refine_split_group( )
    }
    graph_plane[cur_blk] -= 1
    if (graph_plane[cur_blk] == 0) {
        block_completed_graph [cur_blk] = 1
    }
}
```

The scan_graph_data function processes a bitplane of a graphic block. The function loops through all existing non-empty groups three times. The first loop is for the initialization of the three arrays: each_member, split_group and new_group, of which the meanings are explained below. The second loop reads the header of the current bit plane and assigns values for the three arrays. The final loop refines each group and, if necessary, splits an existing group into two. After the whole bitplane is decoded, the number of bitplanes to process for the current block is decreased by 1.

The three arrays are explained as follows:

each_member[k]: is obtained by reading 1 bit from the bitstream, if it is equal to one it is indicated that the bitstream will spend one bit for each member in group k to refine it at the current bit plane; otherwise, one bit is used for all members' refinement, which indicates that all members have the same refinement value in the current bit plane.

split_group[k]: equal to one means that group k should be split into two. This happens only if each_member[k]==1. However, there exist cases that each_member[k]==1 and group k does not split (e.g. where there have been too many groups (nGrps_in_blk[ref_blk]==graph_nGrps_per_blk_max) or group k is too small (nMbrs_in_grp[ref_blk][k]<=graph_nMbrs_per_grp_min)).

new_group[k]: is meaningful only if split_group[k]==1. When group k is to be split, the members with the refinement bit being 0 stays in the original group (k), while the members with the refinement bit being 1 will be sent to the new_group (new_group[k]).

Note that the grouping information is from the reference block (see the find_ref_blk( ) function). If there is any update to the grouping, it also only affects the reference block (see the refine_split_group( ) function). This allows exploitation of the redundancy between the current block and the reference block.

```
Find_ref_blk Syntax
find_ref_blk (cur_blk) {
        if (graph_color_jnt_coding ==0) {
                ref_blk = cur_blk
        } else if (color_format != 1){ /* RGB or YUV444 */
                ref_blk = cur_blk - (cur_blk%3)
        } else if (cur_blk%4!=3) { /* Y or U of YUV422 */
                ref_blk = cur_blk
        } else ( /* V of YUV422*/
                ref_blk = cur_blk - 2
        }
}
``` ref_blk is the first color component of the same spatial block, which is illustrated as follows:

| Color Space | Reference Block |
| --- | --- |
| RGB | R |
| Y of YUV422 | Y |
| UV of YUV422 | U |
| YUV444 | Y |

```
Refine_split_group Syntax
refine_split_group( ) {
        if (each_member[k] == 0) { /* all members have the same refinement */
                graph_bit
                for (j=0; j<nPix_per_blk; j++) {
                        if (group_index[ref_blk][j] == k) {
                                image_data[cur_blk * nPix_per blk+j] |= graph_bit << (graph_plane
                                        [cur_blk] - 1)
                        }
                }
        } else {
                for (j=0; j<nPix_per_blk; j++) {
                        if (group_index [ref_blk][j] == k) {
                                graph_bit
                                image_data[cur_blk*nPix_per_blk+j] |= graph_bit <<
                                        (graph_plane[cur_blk] - 1)
                                if (split_group[k] == 1 && graph_bit == 1) { /* put into the new group */
                                        group_index[ref_blk][j] = new_group[k]
                                        nMbrs_in_grp[ref_blk][k] -=1
                                        nMbrs_in_grp[ref_blk][new_group[k]] += 1
} } } }
```

Read refinement bit(s) from the bitstream to refine members of a particular group. Split the group into two if necessary.

| each_member[k] | split_group[k] | operation |
| --- | --- | --- |
| 0 | 0 | Read graph_bit (1 bit) to refine all members in the group. Members stay in the original group (no operation). |
| 0 | 1 | Not Applicable. |
| 1 | 0 | Read graph_bit (1 bit) for |

-continued

| each_member[k] | split_group[k] | operation |
|---|---|---|
|  |  | each member for refinement; even if the members have different refinement values, they stay in the original group (no operation). |
| 1 | 1 | Read graph_bit (1 bit) for each member for refinement; If the refinement is 0, the member stays in the original group; If the refinement is 1, the member is sent to new_group[k]. |

```
Graph_mode_post Syntax
graph_mode_post( ) {
    for (cur_blk = 0; cur_blk<nblock; cur_blk++) {
        if (block_mode[cur_blk] == 1 &&
            graph_plane[cur_blk] > 0) {
            for (j=0; j<nPix_per_blk; j++) {
                image_data[cur_blk*nPix_per_blk + j] |=
                1 << (graph_plane
                    [cur_blk] − 1)
            } } }
    if (color_format == 0 {
        if (rgb_color_transform != 0 {
            for (i=0; i<nblocks; i+=3 {
                if (block_mode[i] == 1) {
                    if (rgb_color_transform == 1) {
                        yuv2rgb( )
                    }
                    if (rgb_color_transform == 2) {
                        gbr2rgb( )
} } } } } }
```

Mid-point reconstruction of each pixel. Color conversion is performed if necessary.

Figure 4:
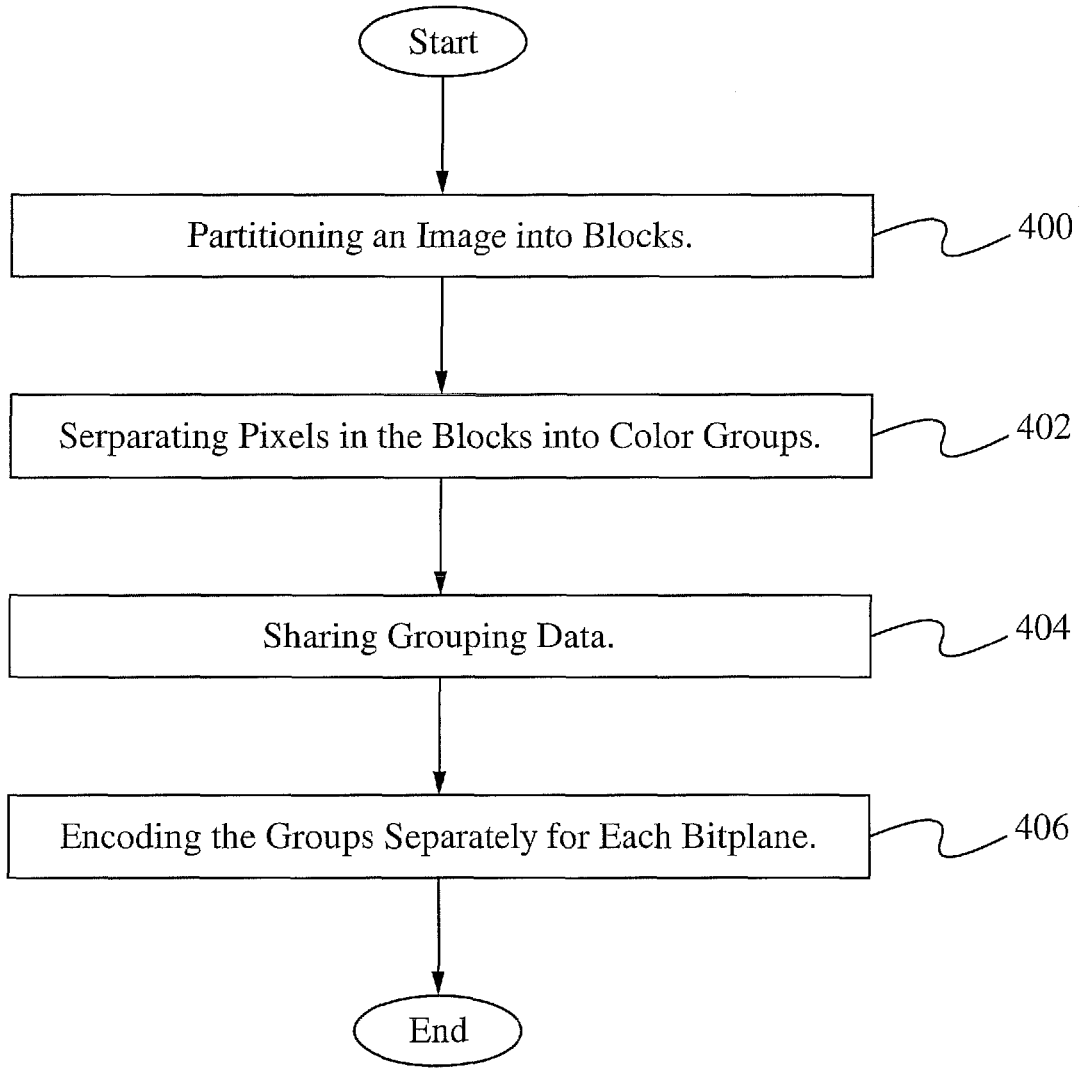
FIG. 4 illustrates a flowchart of a method of implementing graphics mode compression according to some embodiments.

FIG. 4 illustrates a flowchart of a method of implementing graphics mode compression according to some embodiments. In the step 400, an image is partitioned into blocks. In the step 402, the blocks are separated into groups. In some embodiments, the blocks are separated into color groups. In the step 404, grouping data is shared. The grouping data includes information about which groups pixels belong to. In the step 406, each group of the groups is encoded separately for each bit plane, and a block is encoded from the MSB to the LSB, and in each bit plane, all existing groups are processed. Encoding and processing a group includes: if the group members have different values within the current bit plane, the group is split into two, unless the total number of groups reaches a maximum limit of the groups, or the number of members in the group falls below a minimum limit. If either of the two conditions become true, then refinement bits of members of the group are encoded as raw bits. Otherwise, if a split happens to a group, a 0 is sent, followed by one bit indicating the refinement bit of the group members; otherwise a 1 is sent, followed by the refinement bits of each group member, the group is split into two according to the refinement bits, and the split is applied to other colors of the block. In some embodiments, the encoding is based on a color scheme used. If the color scheme includes RGB or YCbCr444 data and separate encoding is used, then all three color components are encoded using scalar EGC. If the color scheme includes RGB or YCbCr444 data and joint encoding is used, then all three color components are jointly encoded. If the color scheme includes YCbCr422 data and separate encoding is used, then Y, U and V are encoded using scalar EGC. If the color scheme includes YCbCr422 data and joint encoding is used, then Y is encoded by itself and U and V are jointly encoded. An indicator indicates which color scheme is implemented, the color scheme selected from the group consisting of RGB, YCbCr444 and YCbCr422 and joint/separate coding. Encoding each bit plane of the block is able to be an arbitrary order, where arbitrary includes any order of color components but going from a most significant bit plane to a least significant bit plane. Although specific steps are described, in some embodiments, fewer or more steps are included, and/or the order of the steps is able to be changed.

Figure 5:
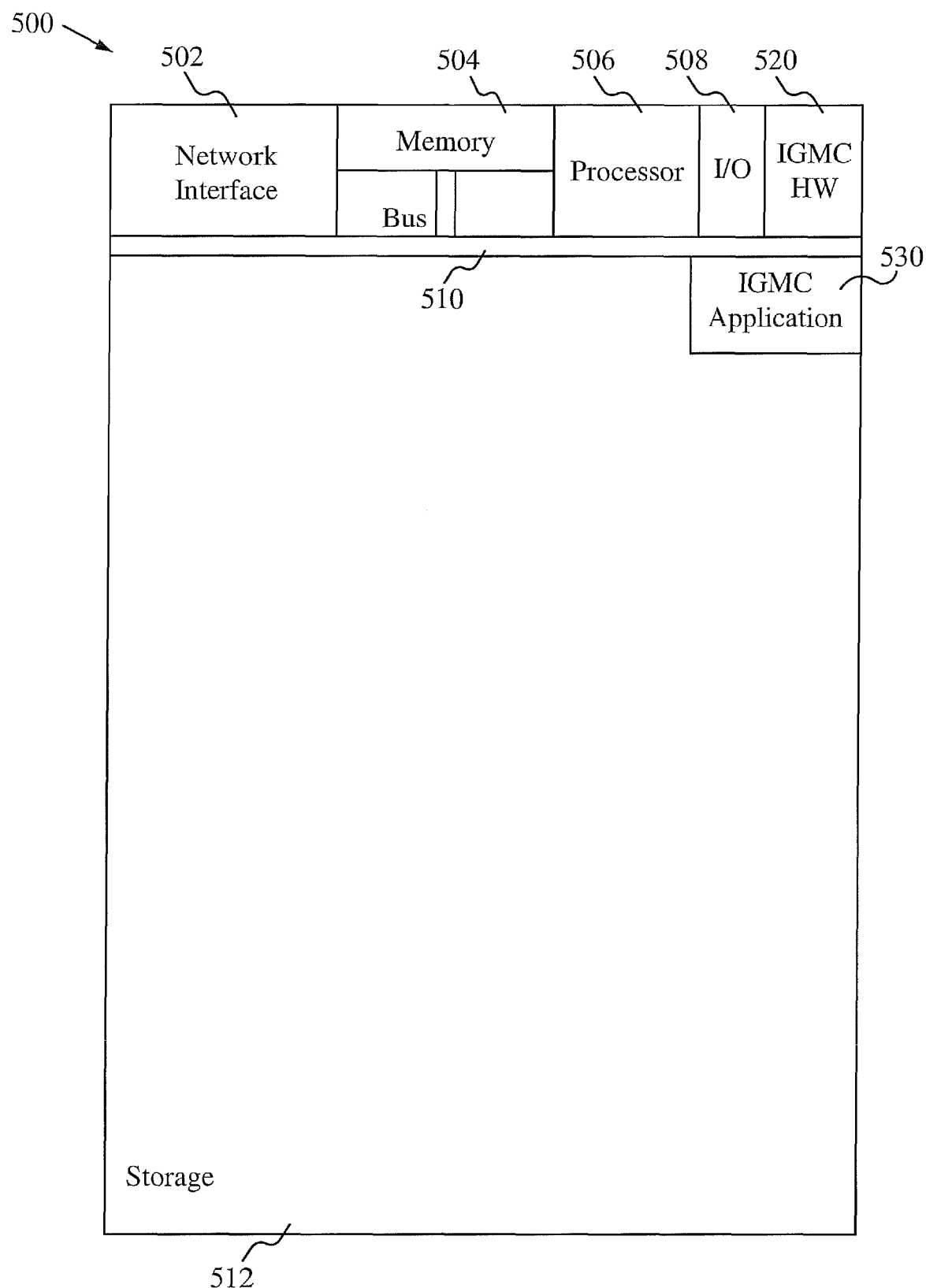
FIG. 5 illustrates a block diagram of an exemplary computing device configured to implement the improved graphics-mode compression method according to some embodiments.

FIG. 5 illustrates a block diagram of an exemplary computing device 500 configured to implement the improved graphics-mode compression method according to some embodiments. The computing device 500 is able to be used to acquire, store, compute, communicate and/or display information such as images and videos. For example, a computing device 500 is able to acquire and store a video. The improved graphics-mode compression method is able to be used during or after acquiring the video, or when transferring the video from the device 500 to another device. In general, a hardware structure suitable for implementing the computing device 500 includes a network interface 502, a memory 504, a processor 506, I/O device(s) 508, a bus 510 and a storage device 512. The choice of processor is not critical as long as a suitable processor with sufficient speed is chosen. The memory 504 is able to be any conventional computer memory known in the art. The storage device 512 is able to include a hard drive, CDROM, CDRW, DVD, DVDRW, flash memory card or any other storage device. The computing device 500 is able to include one or more network interfaces 502. An example of a network interface includes a network card connected to an Ethernet or other type of LAN. The I/O device(s) 508 are able to include one or more of the following: keyboard, mouse, monitor, display, printer, modem, touchscreen, button interface and other devices. Improved graphics-mode compression application(s) 530 used to perform the improved graphics-mode compression method are likely to be stored in the storage device 512 and memory 504 and processed as applications are typically processed. More or less components shown in FIG. 5 are able to be included in the computing device 500. In some embodiments, improved graphics-mode compression hardware 520 is included. Although the computing device 500 in FIG. 5 includes applications 530 and hardware 520 for improved graphics-mode compression, the improved graphics-mode compression method is able to be implemented on a computing device in hardware, firmware, software or any combination thereof. For example, in some embodiments, the improved graphics-mode compression applications 530 are programmed in a memory and executed using a processor. In another example, in some embodiments, the improved graphics-mode compression hardware 520 is programmed hardware logic including gates specifically designed to implement the compression method.

In some embodiments, the improved graphics-mode compression application(s) 530 include several applications and/or modules. As described herein, modules such as color format determination module for determining the color format of a block, a graphics mode module for encoding/decoding a block using the graphics-mode method, a scalar EGC module for encoding/decoding and a joint scalar EGC module for encoding/decoding are included In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-ray® writer/player, a television, a home entertainment system or any other suitable computing device.

In some modified embodiments, instead of determining if a group is too small (e.g. below a size threshold) or the number of groups exceeds a certain limit (e.g. above a quantity threshold), where the raw bits are directly processed, if the number of groups exceeds a predefined limit, then before coding a bit plane, members of all of the groups are set as having refinement bits.

To utilize the improved graphics-mode compression method, a user acquires a video/image such as on a digital camcorder, and while or after the video is acquired, or when sending the video to another device such as a computer, the improved graphics-mode compression method automatically encodes each image of the video, so that the video is encoded appropriately to maintain a high quality video. The improved graphics-mode compression method occurs automatically without user involvement. The video is also able to be decoded to be displayed using a similar method.

In operation, improved graphics-mode compression is used to compress images such as frames of a video. Each image block is processed from the MSB to the LSB, hence the resulting bitstream is still embedded. The improved graphics-mode compression determines if the video includes an RGB, YUV444 or YUV422 color format. If the color format/scheme includes RGB or YCbCr444 data and separate encoding is used, then all three color components are encoded using scalar EGC. If the color scheme includes RGB or YCbCr444 data and joint encoding is used, then all three color components are jointly encoded. If the color scheme includes YCbCr422 data and separate encoding is used, then Y, U and V are encoded using scalar EGC. If the color scheme includes YCbCr422 data and joint encoding is used, then Y is encoded by itself and U and V are jointly encoded. The improved graphics-mode compression method is able to be used in any implementation including, but not limited to, wireless high definition (Wireless HD).

The improved graphics-mode compression method described herein is able to be used with videos and/or images.

High definition video is able to be in any format including but not limited to HDCAM, HDCAM-SR, DVCPRO HD, D5 HD, XDCAM HD, HDV and AVCHD.

Some Embodiments of Modified Bitstream Syntax for Graphics-Mode Compression in Wireless HD 1.1

1. A method of encoding programmed in a controller in a device comprising:
   a. partitioning an image into blocks;
   b. separating the blocks into groups;
   c. sharing grouping data among color components; and
   d. encoding a block from the most significant bit plane to the least significant bit plane and in each bit plane, processing existing groups.
2. The method of clause 1 wherein encoding the block includes encoding each group of the groups separately for each bit plane.
3. The method of clause 1 wherein processing the existing groups includes:
   a. if members of the group have different values within the current bit plane, the group is split into two, unless at least one of two conditions exist, the two conditions including a total number of groups reaching a maximum limit of the groups or the total number of members in the group falling below a minimum limit;
   b. if either of the two conditions become true, then refinement bits of members of the group are encoded as raw bits;
   c. otherwise if a split happens to a group, a value indicating the split is sent, followed by one bit indicating the refinement bit of the group members; otherwise a value indicating no split is sent, followed by the refinement bits of each group member, the group is split into two according to the refinement bits, and the split is applied to additional colors of the block.
4. The method of clause 1 wherein the encoding is based on a color scheme used.
5. The method of clause 4 wherein the color scheme includes RGB or YCbCr444 data, and all three color components are encoded together.
6. The method of clause 4 wherein the color scheme includes YCbCr422 data, and Y is encoded by itself and U and V are jointly encoded.
7. The method of clause 4 wherein the color scheme includes RGB, YCbCr444 or YCbCr422 data, and each color is coded separately.
8. The method of clause 4 wherein an indicator indicates the color scheme implemented, the color scheme selected from the group consisting of RGB, YCbCr444 and YCbCr422 and whether joint coding or separate coding is implemented.
9. The method of clause 1 wherein the grouping data includes information about which groups pixels belong to.
10. The method of clause 1 wherein encoding each bit plane of the block is in an arbitrary order, wherein arbitrary includes any order of color components but going from the most significant bit plane to the least significant bit plane.
11. The method of clause 1 wherein the controller is selected from the group consisting of a programmed computer readable medium and an application-specific circuit.
12. The method of clause 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.
13. An encoder device comprising:
    a. a memory for storing an application, the application for:
       i. partitioning an image into blocks;
       ii. separating the blocks into groups;
       iii. sharing grouping data among color components; and
       iv. encoding a block from the most significant bit plane to the least significant bit plane and in each bit plane, processing existing groups; and
    b. a processing component coupled to the memory, the processing component configured for processing the application.
14. The encoder device of clause 13 wherein encoding the block includes encoding each group of the groups separately for each bit plane.
15. The encoder device of clause 13 wherein processing the existing groups includes:
    a. if members of the group have different values within the current bit plane, the group is split into two, unless at least one of two conditions exist, the two conditions including a total number of groups reaching a maximum limit of the groups or the total number of members in the group falling below a minimum limit;
b. if either of the two conditions become true, then refinement bits of members of the group are encoded as raw bits;
c. otherwise if a split happens to a group, a value indicating the split is sent, followed by one bit indicating the refinement bit of the group members; otherwise a value indicating no split is sent, followed by the refinement bits of each group member, the group is split into two according to the refinement bits, and the split is applied to additional colors of the block.

16. The encoder device of clause 13 wherein the encoding is based on a color scheme used.
17. The encoder device of clause 16 wherein the color scheme includes RGB or YCbCr444 data, and all three color components are encoded together.
18. The encoder device of clause 16 wherein the color scheme includes YCbCr422 data, and Y is encoded by itself and U and V are jointly encoded.
19. The encoder device of clause 16 wherein the color scheme includes RGB, YCbCr444 or YCbCr422 data, and each color is coded separately.
20. The encoder device of clause 16 wherein an indicator indicates the color scheme implemented, the color scheme selected from the group consisting of RGB, YCbCr444 and YCbCr422 and whether joint coding or separate coding is implemented.
21. The encoder device of clause 13 wherein the grouping data includes information about which groups pixels belong to.
22. The encoder device of clause 13 wherein encoding each bit plane of the block is in an arbitrary order, wherein arbitrary includes any order of color components but going from the most significant bit plane to the least significant bit plane.
23. A system programmed in a controller in a device comprising:
a. a partitioning module for partitioning an image into blocks;
b. a separating module for separating the blocks into groups;
c. a sharing module for sharing grouping data among color components; and
d. an encoding module for encoding a block from the most significant bit plane to the least significant bit plane and in each bit plane, processing existing groups.
24. The system of clause 23 wherein encoding the block includes encoding each group of the groups separately for each bit plane.
25. The system of clause 23 wherein processing the existing groups includes:
a. if members of the group have different values within the current bit plane, the group is split into two, unless at least one of two conditions exist, the two conditions including a total number of groups reaching a maximum limit of the groups or the total number of members in the group falling below a minimum limit;
b. if either of the two conditions become true, then refinement bits of members of the group are encoded as raw bits;
c. otherwise if a split happens to a group, a value indicating the split is sent, followed by one bit indicating the refinement bit of the group members; otherwise a value indicating no split is sent, followed by the refinement bits of each group member, the group is split into two according to the refinement bits, and the split is applied to additional colors of the block.
26. The system of clause 23 wherein the encoding is based on a color scheme used.
27. The system of clause 26 wherein the color scheme includes RGB or YCbCr444 data, and all three color components are encoded together.
28. The system of clause 26 wherein the color scheme includes YCbCr422 data, and Y is encoded by itself and U and V are jointly encoded.
29. The system of clause 26 wherein the color scheme includes RGB, YCbCr444 or YCbCr422 data, and each color is coded separately.
30. The system of clause 26 wherein an indicator indicates the color scheme implemented, the color scheme selected from the group consisting of RGB, YCbCr444 and YCbCr422 and whether joint coding or separate coding is implemented.
31. The system of clause 23 wherein the grouping data includes information about which groups pixels belong to.
32. The system of clause 23 wherein encoding each bit plane of the block is in an arbitrary order, wherein arbitrary includes any order of color components but going from the most significant bit plane to the least significant bit plane.
33. The system of clause 23 wherein the controller is selected from the group consisting of a programmed computer readable medium and an application-specific circuit.
34. The system of clause 23 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.
35. A camera device comprising:
a. a video acquisition component for acquiring a video;
b. a memory for storing an application, the application for:
i. partitioning an image of the video into blocks;
ii. separating the blocks into groups;
iii. sharing grouping data among color components; and
iv. encoding a block from the most significant bit plane to the least significant bit plane and in each bit plane, processing existing groups; and
c. a processing component coupled to the memory, the processing component configured for processing the application.
36. The camera device of clause 35 wherein encoding the block includes encoding each group of the groups separately for each bit plane.
37. The camera device of clause 35 wherein processing the existing groups includes:
a. if members of the group have different values within the current bit plane, the group is split into two, unless at least one of two conditions exist, the two conditions including a total number of groups reaching a maximum limit of the groups or the total number of members in the group falling below a minimum limit;
b. if either of the two conditions become true, then refinement bits of members of the group are encoded as raw bits;
c. otherwise if a split happens to a group, a value indicating the split is sent, followed by one bit indicating the refinement bit of the group members; otherwise a value indicating no split is sent, followed by the refinement bits of each group member, the group is split into two according to the refinement bits, and the split is applied to additional colors of the block.

38. The camera device of clause 35 wherein the encoding is based on a color scheme used.

39. The camera device of clause 38 wherein the color scheme includes RGB or YCbCr444 data, and all three color components are encoded together.

40. The camera device of clause 38 wherein the color scheme includes YCbCr422 data, and Y is encoded by itself and U and V are jointly encoded.

41. The camera device of clause 38 wherein the color scheme includes RGB, YCbCr444 or YCbCr422 data, and each color is coded separately.

42. The camera device of clause 38 wherein an indicator indicates the color scheme implemented, the color scheme selected from the group consisting of RGB, YCbCr444 and YCbCr422 and whether joint coding or separate coding is implemented.

43. The camera device of clause 35 wherein the grouping data includes information about which groups pixels belong to.

44. The camera device of clause 35 wherein encoding each bit plane of the block is in an arbitrary order, wherein arbitrary includes any order of color components but going from the most significant bit plane to the least significant bit plane.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of encoding programmed in a controller in a device comprising:
   a. partitioning an image into blocks;
   b. separating the blocks into groups;
   c. sharing grouping data among color components; and
   d. encoding a block from the most significant bit plane to the least significant bit plane and in each bit plane, processing existing groups.

2. The method of claim 1 wherein encoding the block includes encoding each group of the groups separately for each bit plane.

3. The method of claim 1 wherein processing the existing groups includes:
   a. if members of the group have different values within the current bit plane, the group is split into two, unless at least one of two conditions exist, the two conditions including a total number of groups reaching a maximum limit of the groups or the total number of members in the group falling below a minimum limit;
   b. if either of the two conditions become true, then refinement bits of members of the group are encoded as raw bits;
   c. otherwise if a split happens to a group, a value indicating the split is sent, followed by one bit indicating the refinement bit of the group members; otherwise a value indicating no split is sent, followed by the refinement bits of each group member, the group is split into two according to the refinement bits, and the split is applied to additional colors of the block.

4. The method of claim 1 wherein the encoding is based on a color scheme used.

5. The method of claim 4 wherein the color scheme includes RGB or YCbCr444 data, and all three color components are encoded together.

6. The method of claim 4 wherein the color scheme includes YCbCr422 data, and Y is encoded by itself and U and V are jointly encoded.

7. The method of claim 4 wherein the color scheme includes RGB, YCbCr444 or YCbCr422 data, and each color is coded separately.

8. The method of claim 4 wherein an indicator indicates the color scheme implemented, the color scheme selected from the group consisting of RGB, YCbCr444 and YCbCr422 and whether joint coding or separate coding is implemented.

9. The method of claim 1 wherein the grouping data includes information about which groups pixels belong to.

10. The method of claim 1 wherein encoding each bit plane of the block is in an arbitrary order, wherein arbitrary includes any order of color components but going from the most significant bit plane to the least significant bit plane.

11. The method of claim 1 wherein the controller is selected from the group consisting of a programmed computer readable medium and an application-specific circuit.

12. The method of claim 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

13. An encoder device comprising:
   a. a memory for storing an application, the application for:
      i. partitioning an image into blocks;
      ii. separating the blocks into groups;
      iii. sharing grouping data among color components; and
      iv. encoding a block from the most significant bit plane to the least significant bit plane and in each bit plane, processing existing groups; and
   b. a processing component coupled to the memory, the processing component configured for processing the application.

14. The encoder device of claim 13 wherein encoding the block includes encoding each group of the groups separately for each bit plane.

15. The encoder device of claim 13 wherein processing the existing groups includes:
   a. if members of the group have different values within the current bit plane, the group is split into two, unless at least one of two conditions exist, the two conditions including a total number of groups reaching a maximum limit of the groups or the total number of members in the group falling below a minimum limit;
   b. if either of the two conditions become true, then refinement bits of members of the group are encoded as raw bits;
   c. otherwise if a split happens to a group, a value indicating the split is sent, followed by one bit indicating the refinement bit of the group members; otherwise a value indicating no split is sent, followed by the refinement bits of each group member, the group is split into two according to the refinement bits, and the split is applied to additional colors of the block.

16. The encoder device of claim 13 wherein the encoding is based on a color scheme used.

17. The encoder device of claim 16 wherein the color scheme includes RGB or YCbCr444 data, and all three color components are encoded together.

18. The encoder device of claim 16 wherein the color scheme includes YCbCr422 data, and Y is encoded by itself and U and V are jointly encoded.

19. The encoder device of claim 16 wherein the color scheme includes RGB, YCbCr444 or YCbCr422 data, and each color is coded separately.

20. The encoder device of claim 16 wherein an indicator indicates the color scheme implemented, the color scheme selected from the group consisting of RGB, YCbCr444 and YCbCr422 and whether joint coding or separate coding is implemented.

21. The encoder device of claim 13 wherein the grouping data includes information about which groups pixels belong to.

22. The encoder device of claim 13 wherein encoding each bit plane of the block is in an arbitrary order, wherein arbitrary includes any order of color components but going from the most significant bit plane to the least significant bit plane.

23. A system programmed in a controller in a device comprising:
   a. a partitioning module for partitioning an image into blocks;
   b. a separating module for separating the blocks into groups;
   c. a sharing module for sharing grouping data among color components; and
   d. an encoding module for encoding a block from the most significant bit plane to the least significant bit plane and in each bit plane, processing existing groups.

24. The system of claim 23 wherein encoding the block includes encoding each group of the groups separately for each bit plane.

25. The system of claim 23 wherein processing the existing groups includes:
   a. if members of the group have different values within the current bit plane, the group is split into two, unless at least one of two conditions exist, the two conditions including a total number of groups reaching a maximum limit of the groups or the total number of members in the group falling below a minimum limit;
   b. if either of the two conditions become true, then refinement bits of members of the group are encoded as raw bits;
   c. otherwise if a split happens to a group, a value indicating the split is sent, followed by one bit indicating the refinement bit of the group members; otherwise a value indicating no split is sent, followed by the refinement bits of each group member, the group is split into two according to the refinement bits, and the split is applied to additional colors of the block.

26. The system of claim 23 wherein the encoding is based on a color scheme used.

27. The system of claim 26 wherein the color scheme includes RGB or YCbCr444 data, and all three color components are encoded together.

28. The system of claim 26 wherein the color scheme includes YCbCr422 data, and Y is encoded by itself and U and V are jointly encoded.

29. The system of claim 26 wherein the color scheme includes RGB, YCbCr444 or YCbCr422 data, and each color is coded separately.

30. The system of claim 26 wherein an indicator indicates the color scheme implemented, the color scheme selected from the group consisting of RGB, YCbCr444 and YCbCr422 and whether joint coding or separate coding is implemented.

31. The system of claim 23 wherein the grouping data includes information about which groups pixels belong to.

32. The system of claim 23 wherein encoding each bit plane of the block is in an arbitrary order, wherein arbitrary includes any order of color components but going from the most significant bit plane to the least significant bit plane.

33. The system of claim 23 wherein the controller is selected from the group consisting of a programmed computer readable medium and an application-specific circuit.

34. The system of claim 23 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

35. A camera device comprising:
   a. a video acquisition component for acquiring a video;
   b. a memory for storing an application, the application for:
      i. partitioning an image of the video into blocks;
      ii. separating the blocks into groups;
      iii. sharing grouping data among color components; and
      iv. encoding a block from the most significant bit plane to the least significant bit plane and in each bit plane, processing existing groups; and
   c. a processing component coupled to the memory, the processing component configured for processing the application.

36. The camera device of claim 35 wherein encoding the block includes encoding each group of the groups separately for each bit plane.

37. The camera device of claim 35 wherein processing the existing groups includes:
   a. if members of the group have different values within the current bit plane, the group is split into two, unless at least one of two conditions exist, the two conditions including a total number of groups reaching a maximum limit of the groups or the total number of members in the group falling below a minimum limit;
   b. if either of the two conditions become true, then refinement bits of members of the group are encoded as raw bits;
   c. otherwise if a split happens to a group, a value indicating the split is sent, followed by one bit indicating the refinement bit of the group members; otherwise a value indicating no split is sent, followed by the refinement bits of each group member, the group is split into two according to the refinement bits, and the split is applied to additional colors of the block.

38. The camera device of claim 35 wherein the encoding is based on a color scheme used.

39. The camera device of claim 38 wherein the color scheme includes RGB or YCbCr444 data, and all three color components are encoded together.

40. The camera device of claim 38 wherein the color scheme includes YCbCr422 data, and Y is encoded by itself and U and V are jointly encoded.

41. The camera device of claim 38 wherein the color scheme includes RGB, YCbCr444 or YCbCr422 data, and each color is coded separately.

42. The camera device of claim 38 wherein an indicator indicates the color scheme implemented, the color scheme selected from the group consisting of RGB, YCbCr444 and YCbCr422 and whether joint coding or separate coding is implemented.

43. The camera device of claim 35 wherein the grouping data includes information about which groups pixels belong to.

44. The camera device of claim 35 wherein encoding each bit plane of the block is in an arbitrary order, wherein arbitrary includes any order of color components but going from the most significant bit plane to the least significant bit plane.

* * * * *